United States Patent
Bolgar et al.

(10) Patent No.: US 12,366,177 B2
(45) Date of Patent: Jul. 22, 2025

(54) TURBOMACHINE FOR AN AIRCRAFT PROPULSION DRIVE

(71) Applicant: MTU Aero Engines AG, Munich (DE)

(72) Inventors: Istvan Bolgar, Sengenthal (DE); Francois Cottier, Unterschleissheim (DE); Milena Fois, Saint-Egreve (FR)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 18/609,528

(22) Filed: Mar. 19, 2024

(65) Prior Publication Data

US 2024/0318578 A1  Sep. 26, 2024

(30) Foreign Application Priority Data

Mar. 24, 2023 (DE) ............ 10 2023 107 536.5
Jun. 30, 2023 (DE) ............ 10 2023 117 412.6

(51) Int. Cl.
*F01D 25/12* (2006.01)

(52) U.S. Cl.
CPC ........ *F01D 25/12* (2013.01); *F05D 2260/213* (2013.01)

(58) Field of Classification Search
CPC .... F02C 3/30; F02C 7/08; F01D 25/12; F05D 2260/213
See application file for complete search history.

(56) References Cited

U.S. PATENT DOCUMENTS

| | | |
|---|---|---|
| 2,613,501 A | 10/1952 | Price |
| 3,429,122 A | 2/1969 | Pravda et al. |
| 4,569,195 A * | 2/1986 | Johnson ............ F01K 21/047 60/39.55 |
| 2013/0086906 A1* | 4/2013 | Thomas ............ F02C 7/00 60/690 |
| 2013/0227946 A1* | 9/2013 | Berger ............ F22B 21/24 165/175 |
| 2016/0146542 A1 | 5/2016 | Veilleux, Jr. |
| 2022/0034241 A1 | 2/2022 | Bairley et al. |
| 2023/0279806 A1* | 9/2023 | Terwilliger ............ F02C 7/224 60/775 |

FOREIGN PATENT DOCUMENTS

| | | |
|---|---|---|
| DE | 4216278 A1 | 11/1993 |
| DE | 102010046804 A1 | 3/2012 |

(Continued)

OTHER PUBLICATIONS

Meyer, C.J. and Kroger, D.G., "Air-cooled heat exchanger inlet flow losses", Applied Thermal Engineering, vol. 21, Issue 7, May 2001, pp. 771-786.

(Continued)

*Primary Examiner* — Shafiq Mian (74) *Attorney, Agent, or Firm* — Hinckley, Allen & Snyder, LLP; David Josephs (57) ABSTRACT

The invention relates to a turbomachine for a flight propulsion drive with a compressor, a combustion chamber, a turbine through which a gas flow flows in the flow direction of turbomachine, and a heat exchanger downstream of the turbine, wherein the heat exchanger is equipped to generate steam from water using energy from the gas flow, which can be supplied with fuel to the gas flow for combustion in the combustion chamber.

6 Claims, 7 Drawing Sheets

(56) References Cited

FOREIGN PATENT DOCUMENTS

| | | |
|---|---|---|
| DE | 102018208026 A1 | 11/2019 |
| EP | 2472067 B1 | 9/2013 |
| EP | 2591220 B1 | 8/2016 |
| FR | 58585 E | 1/1954 |
| FR | 3071551 B1 | 11/2019 |
| WO | 2022028653 A1 | 2/2022 |

OTHER PUBLICATIONS

Seo, Seok Bin, "Application of adjoint-based sensitivity analysis to natural circulation of high-Pr fluid inside heat transport system", Nuclear Engineering and Design, vol. 381, Sep. 2021, 111349.
Gonser, Henrik, "Investigations into the use of heat exchangers in civil turbojet engines", Institute for Aviation Propulsion at the University of Stuttgart, Schwabhausen, Oct. 10, 2008.

* cited by examiner

TURBOMACHINE FOR AN AIRCRAFT PROPULSION DRIVE

BACKGROUND OF THE INVENTION

The invention relates to a turbomachine for a flight propulsion drive with a gas flow in a flow direction of the turbomachine through a compressor, a combustion chamber, a turbine and a heat exchanger downstream of the turbine, wherein the heat exchanger is equipped to use energy from the gas flow to produce steam from water, which can be supplied with the fuel to the gas flow for burning in the combustion chamber.

In order to reduce the negative environmental impact of air traffic, attempts are being made to use water or steam in stationary turbomachines to improve performance and to reduce emissions. For example, "Water-Enhanced Turbofan (WET)" technology relies on water injection into the combustion chamber. Here, steam can be generated in a steam generator arranged downstream of an engine turbine by means of the exhaust energy, which is delivered in the combustion chamber region. After flowing through the steam generator, moist exhaust gas can flow through other components that are designed to separate water from the exhaust gas and to supply or use this water for steam generation. The prerequisites for this WET-concept are an efficient recovery of the water present in the exhaust gas and utilization of energy present in the turbomachine exhaust gas to generate steam from the recovered water. Achieving a homogenous flow distribution of the exhaust gas becomes difficult when a heat exchanger is installed downstream of the turbine of a turbomachine, especially if the exhaust flow is deflected from the main flow direction. If a heat exchanger has multiple flow channels arranged in parallel, depending on the orientation of the flow channel, there is a risk of the heat transferred varying due to a non-homogenous distribution of heat in the gas flow, which can lead to an aerothermal asymmetry. Apart from a loss of power, this can also result in instabilities in the evaporation process of the evaporator. Therefore, a challenge here is to direct the exhaust gas flow to the heat exchanger or evaporator in such a way that uniform heat transfer takes place and an aerothermal asymmetry can be avoided.

SUMMARY OF THE INVENTION

Starting from this, an object of the present invention is to propose an improved turbomachine for a flight propulsion drive, by means of which, particularly, the steam generation and/or the efficiency is improved. This is accomplished in accordance with the invention by the teachings of the independent claims. Advantageous embodiments of the invention are the subject of the dependent claims.

In order to achieve the object, a turbomachine is proposed for a flight propulsion drive with a gas flow in the flow direction of the turbomachine through a compressor, a combustion chamber, a turbine and a heat exchanger downstream of the turbine, wherein the heat exchanger is equipped to use energy from the gas flow to produce steam from water, which can be supplied with the fuel to the gas flow for burning in the combustion chamber. The heat exchanger has at least two flow channels primarily extending in the at least one transfer plane, in which water can flow essentially parallel to the flow direction of the turbomachine, wherein each flow channel is arranged in the at least one transfer plane in the flow direction of the turbomachine equidistant to the turbine.

Within the meaning of the present disclosure, a transfer plane is described, particularly which is oriented in the flow direction of the turbomachine, in which at least two flow channels or sections of a flow channel run. Depending on the construction of the heat exchanger and, in particular, the flow guidance in the heat exchanger, the transfer plane can even deviate from the conventional planar form and, in particular, have another geometric form, for example, a cylinder barrel form—in particular, the type where the flow channels extending in the transfer plane in the flow path of the gas flow are arranged approximately the same or are swept over by the gas flow along the same flow path. Due to the typically symmetrical construction of a heat exchanger or the arrangement of the flow channels, the water flows in parallel paths through the at least two flow channels of a transfer plane, so that the water flowing in the flow channels typically has the same temperature at the same position adjacent to the transfer plane.

Particularly within the meaning of the present disclosure, equidistant means that a point closest to the turbine of each flow channel in a transfer plane and thereby the water flowing in parallel in different channels through the heat exchanger, is at the same distance from the turbine or is arranged at the same axial position relative to the turbine or to the turbomachine.

Since each flow channel of a transfer plane is at the same distance from the turbine, the gas flowing out of the turbine reaches each flow channel and the water flowing therein essentially at the same time, whereby a homogenous heat transfer from the gas flow to the flow channels and the water flowing therein takes place. In particular, a homogenously distributed heat transfer can take place over the longitudinal extension of the flow channels or over a flow course of the water in each flow channel in order to avoid aerothermal asymmetry in the heat exchanger.

A turbomachine for an aircraft propulsion drive has a compressor, a combustion chamber and a turbine. During operation of the turbomachine air is compressed in a compressor, mixed with the fuel in the combustion chamber and ignited in order to drive the turbine. Furthermore, the turbomachine can have a fuel preparation system to prepare the fuel before it burns in the combustion chamber, which can, in particular, use the steam generated in the heat exchanger. The proposed turbomachine additionally has a heat exchanger arranged downstream of the turbine, particularly in which, water extracted from the gas flow or the exhaust gas of the turbomachine and supplied to the heat exchanger, is generated using the energy of the gas flow.

A flight propulsion drive can have, in particular, such an axial turbomachine, wherein the turbomachine has an exhaust gas treatment device, which is, in particular, arranged downstream of the turbine of the turbomachine. The exhaust gas treatment device can comprise a heat exchanger, a cooling device and a water separator device, which can be arranged in the flow direction of the turbomachine at least partly on an exhaust channel of the exhaust gas treatment device or the gas flow can flow through the heat exchanger, the cooling device and the water separator device in succession. The gas flow after the turbine or an exhaust gas of the aircraft engine or the turbine can be cooled down to a temperature lower than the gas temperature at the turbine outlet or an initial exhaust gas temperature. Here, energy is removed from the gas flow by means of the heat exchanger, which is then used to generate steam, whereby the temperature of the gas flow is reduced.

The cooling device arranged downstream in the flow direction of the heat exchanger can be designed as a condenser (condenser heat exchanger) or can have a condenser which uses the ambient air as cooling fluid, which, for example, can be conveyed by a blower or a fan of the aircraft engine. This condenser heat exchanger can essentially have two regions, wherein in the first upstream region an (additional) cooling of essentially a gaseous exhaust gas flow takes place. In a second region downstream of the first region, the exhaust gas is cooled, so that the liquid water content present in the exhaust gas flow can be extracted from the exhaust gas flow. The liquid water content can be separated from the gas flow in the water separator device and supplied to the heat exchanger for steam generation. In doing so, the recovered water can be reintroduced in an operation process of the turbomachine.

The invention is based, among other things, on the idea of designing a flow channel or a material flow guide in the heat exchanger in such a way that an orientation or arrangement of each water-carrying flow channel that extends in the same transfer plane and therefore in the same region of the heat exchanger an orientation or arrangement is carried out in such a way that it enables a comparable or essentially similar flow in each flow channel in a heat exchanger or tube bundle plane relative to the gas outlet of the turbine. Here, it is suggested that each flow channel, which is arranged in the same transfer plane- and thus, in the same temperature range of the heat exchanger, is positioned relative to the turbine, and therefore to the gas flow, in such a way that each flow channel is arranged in the direction of the turbomachine axis at the same distance to the turbine, particularly to the last stage of the turbine, in order to achieve a homogenous flow distribution of the gas flow over each flow channel. Hereby, the gas flow can be used for efficient steam generation or superheating of the steam in the heat exchanger, which, in particular, results in higher thermal efficiency by utilizing the exhaust gas energy. To achieve this, the heat exchanger can, for example, be designed as a shell-and-tube heat exchanger or shell-and-tube recuperator, wherein the flow channels form the tube bundles or tubes.

In one embodiment, the flow channels are arranged parallel relative to one another in a transfer plane, whereby the flow channels are, in particular, arranged evenly spaced to each other. This form enables the gas flow to flow through several flow channels particularly uniformly, in order to support a homogenous heat transfer. Here, the transfer plane can be arranged horizontally or at an angle with the longitudinal axis and/or the transverse axis of the turbomachine. In some embodiments the flow channels can run in several planes arranged parallel to one another, wherein the planes can be arranged parallel or at an angle to one another and/or asymmetrically around an axis. In particular, the planes are perpendicular to the at least one transfer plane.

In one embodiment, the at least one flow channel has at least two sections arranged parallel to one another, with each running in different transfer planes arranged parallel to one another. These parallel sections are designed particularly straight. In doing so, the sections are typically connected to one another at their ends, so that the water can flow through the sections of the at least one flow channel in succession, in particular, in a meandering manner. As a result, the water can be guided in opposite directions in two adjacent sections and gas flow can flow around, in order to enable heat transfer, for example, in a cross-counterflow manner, between the gas flow and the water flowing in the at least one flow channel. This enables a more homogenous flow distribution of the gas flow and with it a more uniform heat transfer to the flow channel can be achieved.

In one embodiment, the gas flow can flow around the at least one flow channel at least in sections at an angle, in particular, vertically. Here, a flow configuration, in particular of a cross-flow heat exchanger is intended, so that the gas flow is uniform over the at least one flow channel over its longitudinal extent. Here, the at least one flow channel, for example, can flow in or flow around an angle of approximately 90° or in a range of approximately 70° to 110°. For this purpose, the heat exchanger can be set up to guide the gas flow into the region of flow channels at an angle of approximately 90° and to guide it over, in particular, all sections of the flow channel at approximately this angle. In order to achieve flow around the at least one flow channel by means of the gas flow that runs essentially perpendicular to the at least one flow channel, the heat exchanger can have a deflection device for the gas flow. Here, by means of the deflection device of the heat exchanger and/or in the heat exchange region, a deflection of the gas flow in relation to the flow direction or the main flow axis of the turbomachine can be achieved in order to enable a heat transfer, in particular, in cross-flow or counter-crossflow between the gas flow and the water flowing in the at least one flow channel. As a result, the flow distribution of the gas flow relative to the flow channels can be approximately the same for each of the flow channels in order to further avoid aerothermal asymmetry and reduce the resulting power losses.

In one embodiment, the flow channels are arranged symmetrically around a common axis, especially the rotation axis of the turbomachine. Here, the flow channels can be arranged evenly spaced relative to each other or arranged in clusters and/or arranged, for example, in an annular form. In this case, the heat exchanger can be equipped for flow around the flow channels from an inner diameter of the annular arrangement, in particular, in a radially outward direction. With such an embodiment, the gas flow can simultaneously flow around several flow channels, in particular homogeneously or evenly, and in particular at an angle, in order to achieve greater heat transfer and thus be able to generate a larger quantity of steam or steam with higher superheating.

In one embodiment, the flow channels enclose an incident angle with the flow direction of the turbomachine. The incident angle can be, in particular, between 0° and 45°, further, in particular, between 5° and 35° and further, in particular, between 15° and 30°. Here, the heat exchanger can be equipped to direct the gas flow via the flow channels at an angle to the transfer plane, in particular, perpendicular to the latter, in particular to be able to provide the flow characteristics of a cross-flow or cross-counterflow heat exchanger. In this way, for example, structural integration into the turbomachine and interaction with other components in a WET concept, such as the condenser, can be improved, in particular through the adjusted guidance of the gas flow.

In one embodiment, at least two sections of the at least one flow channel have different internal cross-sections. One internal cross-section is understood to be, in particular, an internal pipe cross-sectional area of a flow channel or a section of the flow channel. Here, for example, at least two sections can be arranged in at least two transfer planes, wherein sections of different transfer planes can have different internal cross sections. In this way, sections which are arranged upstream or closer to the turbine in the flow direction of the gas flow can have a smaller diameter than sections which are arranged downstream or further away from the turbine and/or closer to a supply of water in the flow channel. This enables, for example, water in liquid state to flow in sections of the flow channel having smaller internal cross-sections and increasing degrees of evaporation in sections having larger internal cross-sections in order to counter the change in the Reynolds number that occurs when the water changes phase during evaporation along the flow path, whereby the ratio of heat transfer to pressure losses can be improved.

In one embodiment, at least two sections of the flow channels are connected by means of a connecting element. In this case, the connecting element can be designed to fluidly connect two, in particular, parallel and/or adjacent sections to one another, particularly in order to have no interference in the flow cross-section or the internal cross-section. For example, the connecting device can be designed as a bent section, which can be designed as an integral component or as a separate component, as a manifold or ring distributor. This allows the water flowing through the flow channel to flow in opposite directions (back and forth) in two adjacent sections, which, in particular, enables heat exchange in cross-counterflow. Additionally, a connection of parallel sections of a flow channel can be provided by means of one or more connecting elements, so that one or more sections can comprise different geometries and/or different materials.

In one embodiment the connecting element equipped to deflect water from one section of a flow channel into at least the next section of the flow channel. Here, two parallel and/or adjacent sections, especially at least two transfer planes are connected to each other, wherein a connection, for example, can be designed, in particular, in form of a direct tube-to-tube connection, in particular, in the form of one or more tube transition piece(s), tube collector, manifold(s) and/or ring distributor.

In one embodiment, the number of first sections differs from the number of second sections of the heat exchanger. In doing so, flow guidance of the water can be adjusted, particularly when there is a phase change with evaporation, so that a favorable heat transfer takes place over the entire flow course of the water. Such an embodiment can be equipped with a connecting element to collect the water in a plenum from sections of a transfer plane arranged upstream in the flow direction of the water and to direct or distribute it into sections of the subsequent transfer plane in the flow direction of the water. In this way, differing numbers of sections in different transfer planes can be connected in a way such that flow is possible through them and at the same time a favorable water flow can be aided.

In one embodiment, the at least one flow channel has a flow element. Here, a flow element can be, for example, an element or an insert, which can be arranged in a cross-section of the at least one flow channel through which flow is possible. The flow element can be designed as a constriction and/or an interfering structure and, for example, can be equipped to reduce the cross-section of the flow channel at least in the sections in order to prevent or reduce instabilities related to flow mechanics. In other embodiments, the flow element can be designed in a grid structure, which can be arranged, in particular, in an evaporation region of the flow channel. Such a grid structure can create turbulence and increase the mixing of the water or the steam. In this way, for example, the droplets present in the water (steam) flow can be brought to a wall of the flow channel or to a part of the flow element that is connected to the wall in a heat-conducting manner, where enough heat is supplied for them to evaporate. In this way, the performance of the heat exchanger can be improved.

BRIEF DESCRIPTION OF THE DRAWING FIGURES

Additional features, advantages and application possibilities of the invention arise from the following description in conjunction with the figures. In general, features of the various exemplary aspects and/or embodiments described herein may be combined with one another unless they are explicitly excluded in the context of the disclosure.

In the following part of the description, reference is made to the figures, which illustrate specific aspects and embodiments of the present invention. It is obvious that other aspects can be used and that structural or logical changes to the illustrated embodiments are possible without departing from the scope of the present invention. The following description of the figures is therefore not to be understood as being limiting. Shown are.

DESCRIPTION OF THE INVENTION

Figure 1:
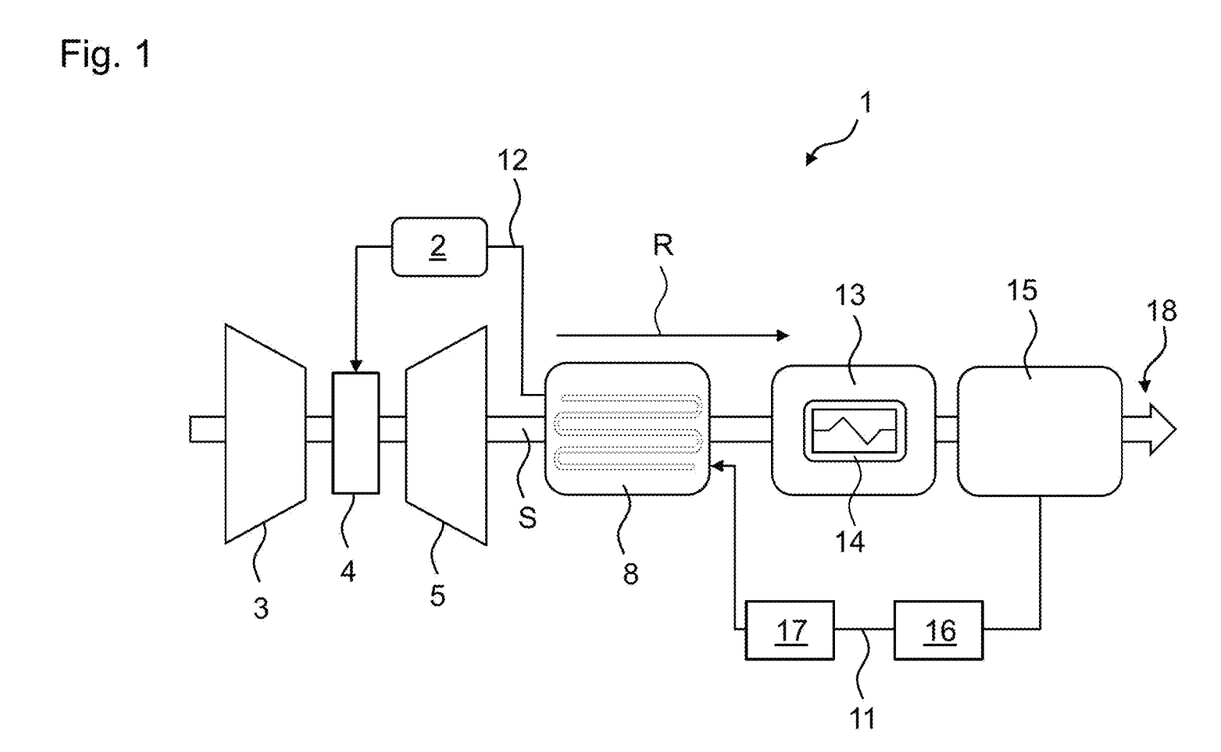
FIG. 1 is a schematic view of an exemplary turbomachine for a flight propulsion drive as per the present disclosure.

FIG. 1 shows a schematic representation of a turbomachine 1 for a flight propulsion drive according to the invention.

The turbomachine 1 is designed, for example, as a turbofan and has a compressor 3, a combustion chamber 4 and a turbine 5, through which gas flow S flows in a flow direction R of the turbomachine 1 or through which gas flow S flows through the turbomachine 1 during operation of the turbomachine 1. Downstream of the turbomachine 5 in the flow direction R, the turbomachine 1 has a heat exchanger 8 designed as an evaporator, which is equipped to generate steam from water using energy from the gas flow S.

This steam can be supplied via a steam feed 12, particularly combined with a fuel in the gas flow S for combustion in the combustion chamber 4. The steam feed 12 can have a mixing chamber 2 of a fuel preparation system, into which fuel can be introduced and thus fed to the steam introduced there, whereby the fuel can vaporize. Thus, a mixture can be formed from the steam and the fuel, which is fed to the combustion chamber 4 of the turbomachine 1. In some embodiments, the steam can also be supplied to the gas flow S in front of and/or in the combustion chamber 4.

Based on a global flow direction R of the gas flow S illustrated by an arrow, which is arranged essentially parallel to the axis of rotation of the turbomachine 1, the gas flow S first passes through the compressor 3, the combustion chamber 4 and the turbine 5. The gas flow S can flow from the turbine 5 into the heat exchanger 8, which is arranged upstream of a cooling device 13 and a water separation device 15 in the flow direction of the gas flow S.

The cooling device 13 can be equipped with a condenser 14 for cooling with ambient air in order to separate any steam and/or water present in the gas flow S. In the present exemplary embodiment, a water separator 15 is arranged downstream of the cooling device 13, which can be designed as a droplet separator to collect the water. The residual gas flow S can leave the turbomachine 1 through an outlet 18 and, in particular, can be released into the environment.

The separated water can, for example, be fed into a water reservoir 17 through an optional water treatment system 16, where it is available for further use. By means of a feed device 11, the water can be supplied to the heat exchanger 8 in order to generate steam, which can be fed to the gas flow S in the region of the combustion chamber 4.

Exemplary embodiments of the heat exchanger 8 of the turbomachine 1 are described in more detail below in combination with FIGS. 2 to 8B.

Figure 2:
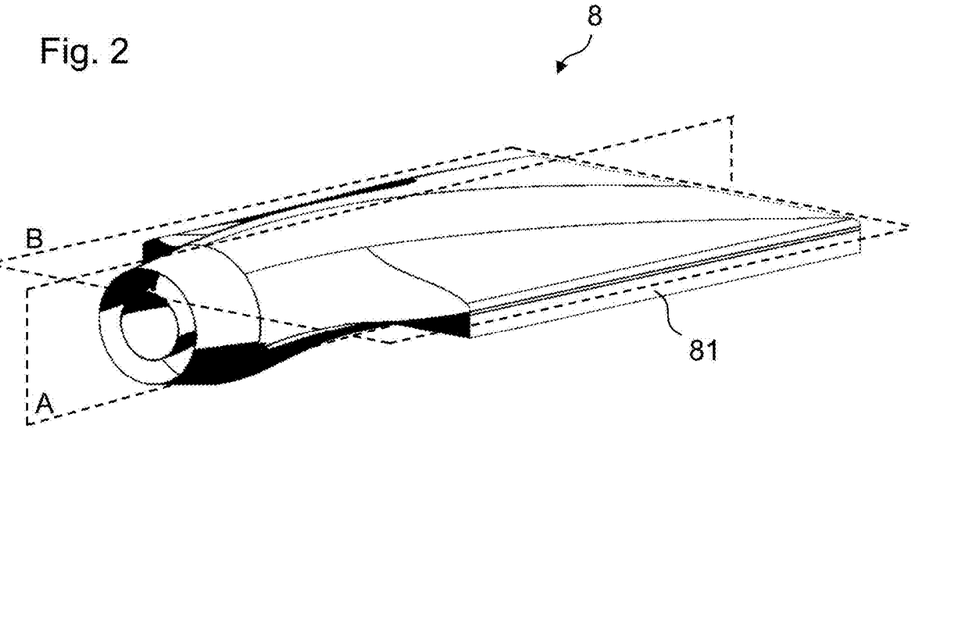
FIG. 2 is a schematic view of an embodiment of a heat exchanger of an exemplary turbomachine as per the present disclosure.

FIG. 2 shows a perspective representation of a first exemplary embodiment of a heat exchanger 8, such as may be envisaged in a turbomachine 1 of FIG. 1.

The heat exchanger example 8 is essentially planar in form and has a heat exchange region 81 extending in a plane B, in which the at least one of the flow channels 20 is arranged, through which water flows, and the gas flow S flows around it. In particular, the heat exchanger 8 can have several heat exchange regions 81.

Figure 3:
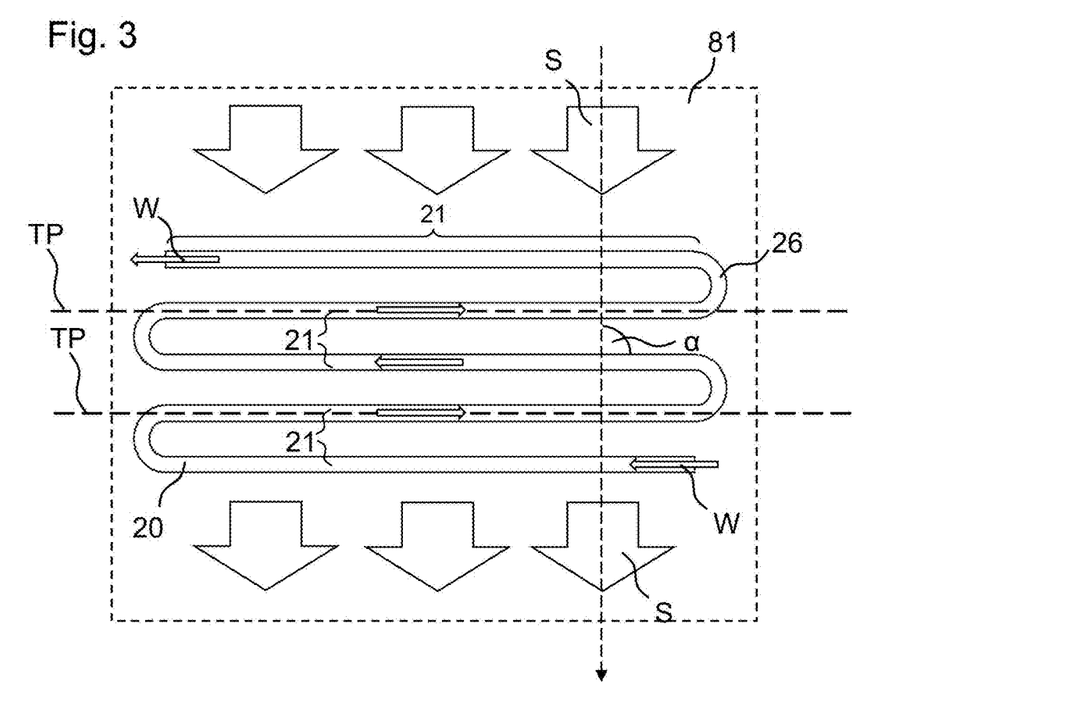
FIG. 3 is a schematic sectional view of an exemplary embodiment of a heat exchanger of a turbomachine example as per the present disclosure.

FIG. 3 shows a schematic representation of an interface A from FIG. 2 of an exemplary embodiment of a heat exchange region 81 of a heat exchanger 8, such as may be envisaged in a turbomachine 1 of FIG. 1 or a heat exchanger 8 of FIG. 2.

In the heat exchange region 81 a flow channel 20 runs essentially parallel to the planar extent of the heat exchange region 81 as well as flow direction R of the turbomachine 1 and water W flows through it. In this case, the flow channel 20 has at least two, here five, sections 21 arranged parallel to each other, which run in several parallel transfer planes TP (for example, only two transfer planes TP are represented). The transfer planes TP are arranged in the described embodiment parallel to the planar extent of the heat exchange region 8. The sections 21 can be connected by means of a connecting device 26 in a one-to-one arrangement for fluid guidance.

The heat exchanger 8 and/or the heat exchange region 81 are particularly designed in such a way that the at least one flow channel 20 of the gas flow S can flow an angle α of the gas flow S. Here, a heat exchange can take place in cross-counterflow between the water W and the gas flow S. In doing so, the water W and the gas flow S in the construction described form an angle α of approximately 90° to each other.

Figure 4A:
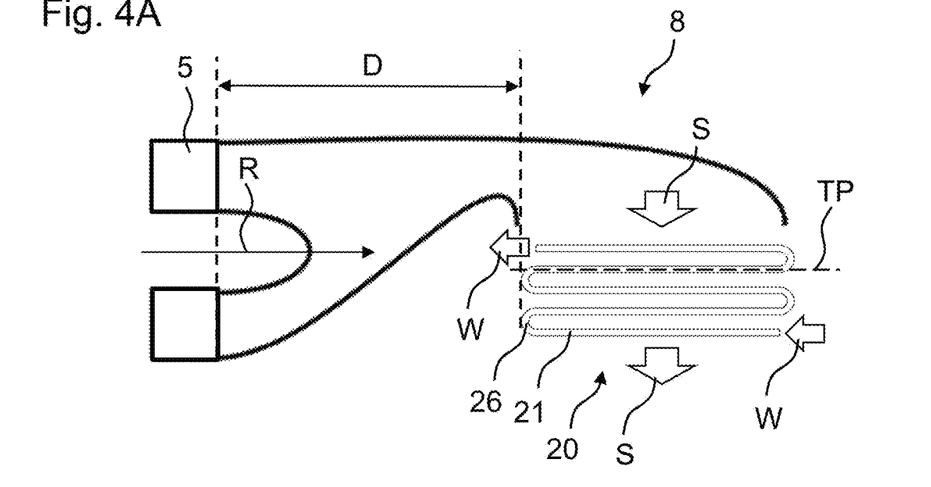
FIGS. 4A, 4B are schematic views of a first exemplary embodiment of a heat exchanger of a turbomachine example as per the present disclosure.
Figure 4B:
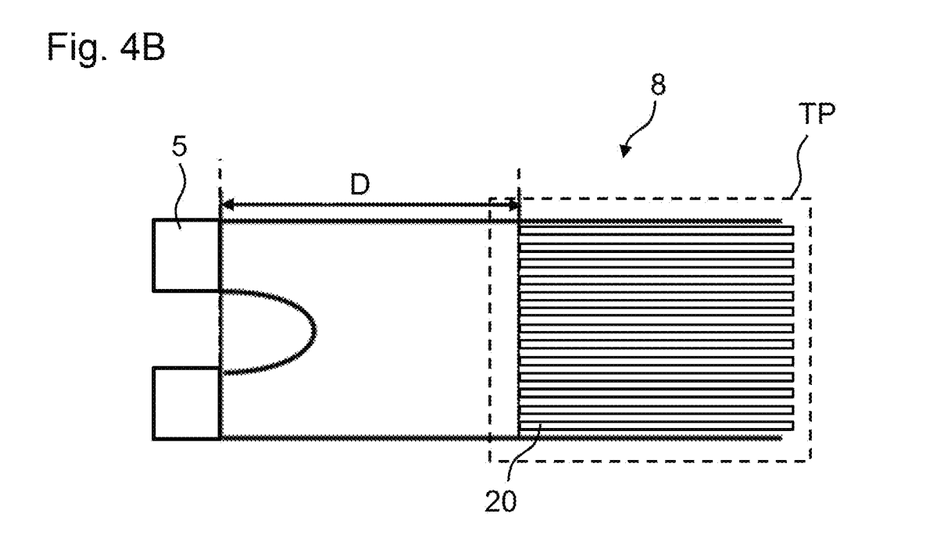

FIGS. 4A and 4B show schematic views of the first embodiment of a heat exchanger 8 from FIG. 2.

FIG. 4A shows a schematic sectional view in a plane A of the heat exchanger 8 from FIG. 2. The heat exchanger 8 has at least two flow channels extending in a transfer plane TP, through which water W can flow essentially parallel to the flow direction R of the turbomachine 1. Due to the sectional plane arranged perpendicular to the transfer plane TP, only one flow channel 20 is shown. Each flow channel 20 of each transfer plane TP is arranged equidistant from the turbine 5 in the flow direction R of the turbomachine. Equidistant here means, in particular, that a point of each flow channel 20 of a transmission plane TP that is closest to the turbine 5 has the same distance D from the turbine 5 or is arranged in the same axial position relative to the turbine 5 and/or relative to the turbomachine 1. All sections of the respective flow channel 20 can be arranged equidistant to the turbine 5. If the sections 21 of the flow channel 20 are connected to one another by means of at least one connecting device 26, these connecting devices 26 can be arranged equidistant to the turbine 5.

FIG. 4B shows a schematic sectional view in a plane B of the heat exchanger 8 from FIG. 2.

As can be seen, the heat exchanger 8 has several flow channels 20 in a transfer plane TP and these are arranged parallel to each other and through these water W can flow; each channel can have several sections 21 arranged in parallel transfer planes TP. The gas flow S can flow around the flow channel 20 in a direction perpendicular to the drawing plane in order to release energy to the water flowing therein. All flow channels 20 are at the same distance D from the turbine 5, so that gas flow S can flow uniformly around all flow channels 20 in order to generate steam.

Figure 5A:
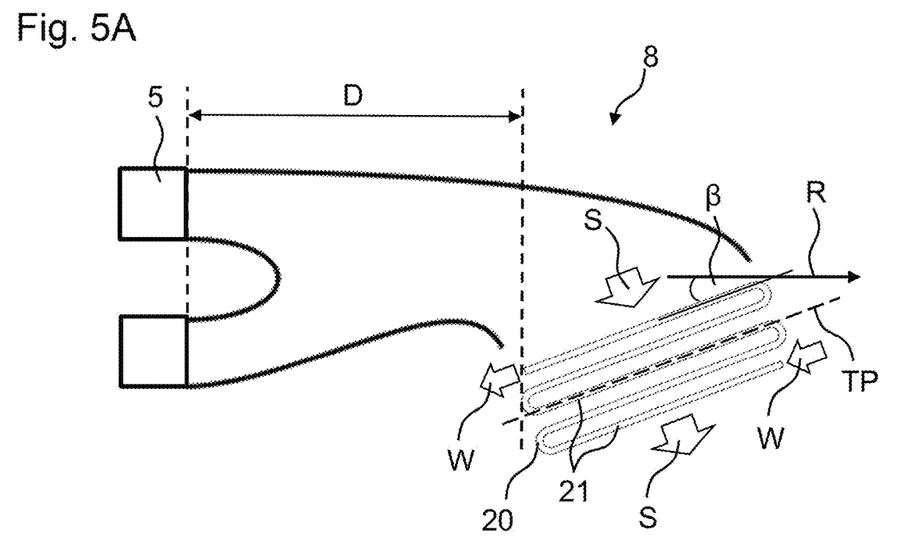
FIGS. 5A, 5B are each a schematic view of a second and third exemplary embodiment of a heat exchanger of a turbomachine example as per the present disclosure.
Figure 5B:
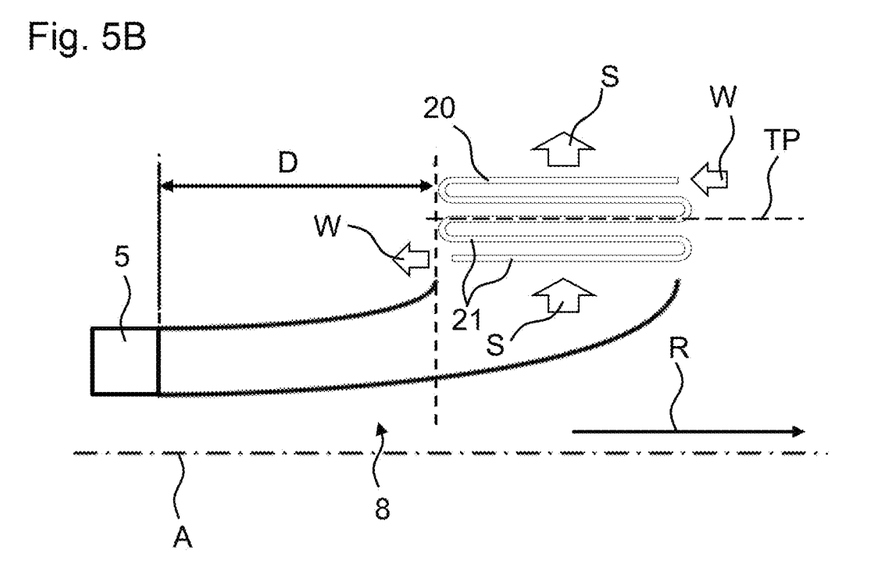

FIGS. 5A and 5B each show schematic views of another embodiment of a heat exchanger 8 of a turbomachine 1 from FIG. 1.

FIG. 5A is a schematic sectional view in a plane through a longitudinal axis (corresponding to plane A of FIG. 2) of a second embodiment of a heat exchanger 8. The heat exchanger 8 has a heat exchange region 81 with at least one flow channel 20 through which water W can flow essentially parallel to the flow direction R of the turbomachine 1. Each flow channel 20 extends in at least one transfer plane TP and encloses an incident angle β with the flow direction R of the turbomachine 1. Such an incident angle ß can be, for example, between 15° and 30°. As a result, an external geometry of the heat exchanger 8 can be designed to fit, for example, into the available installation space. In one embodiment, all sections of the respective flow channel 20 can also be arranged equidistant from the turbine 5 or the sections of the sections 21 of a flow channel 20, each extending in different transfer planes TP, as shown in FIG. 5A, can have varying distances D from the turbine 5 for each TP. If sections 21 of the flow channel 20 are connected to one another by means of at least one connecting device 26, these connecting devices 26 are, in particular, arranged closest to the turbine 5 depending on the embodiment, and are therefore arranged correspondingly equidistant or at varying distances D to the turbine 5.

FIG. 5B is a schematic sectional view of a third embodiment of a heat exchanger 8 designed to be rotationally symmetric in a plane through a longitudinal axis. The heat exchanger 8 has flow channels 20 arranged asymmetrically around a common axis A, through which water W essentially flows parallel to the flow direction R of the turbomachine 1. Each flow channel 20, particularly, for each transfer plane TP is arranged equidistant to the turbine 5 in the flow direction R of the turbomachine 1.

The heat exchanger 8 shown in FIG. 5B, for example, is particularly designed in such a way that the flow channels 20 are arranged in an annular or hollow-cylindrical arrangement and the gas flow S can flow around an inner circumference of the annular or hollow cylindrical arrangement, in particular, in a radially outward direction. In doing so, heat transfer can occur in cross-counterflow manner between water W and gas flow S.

Figure 6A:
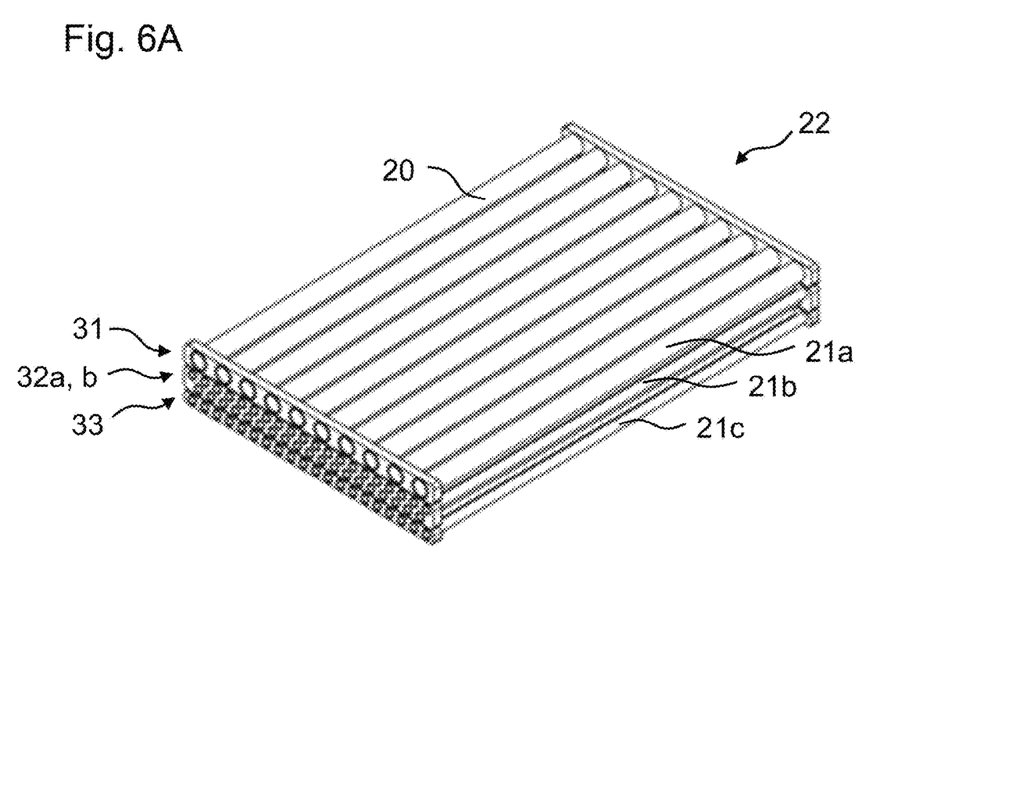
FIGS. 6A, 6B are schematic views of a first exemplary embodiment of flow channels of a heat exchanger of a turbomachine example as per the present disclosure.
Figure 6B:
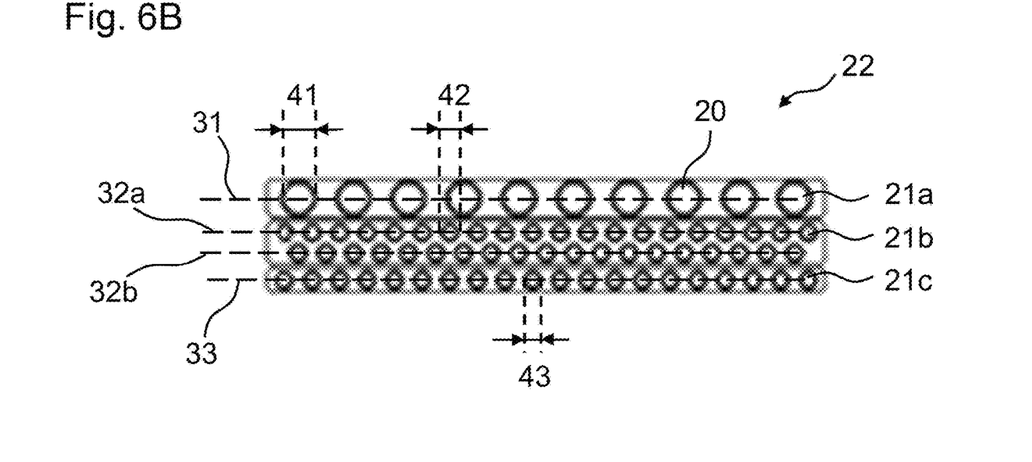

FIGS. 6A and 6B each show views of flow channels 20 in a parallel arrangement, particularly of a flow channel arrangement 22 of a heat exchanger in the form of a tube bundle.

FIG. 6A shows a perspective view of a first exemplary embodiment of a flow channel arrangement 22. The flow channels 20 have three sections 21a, 21b, 21c arranged parallel to one another, each of which is arranged parallel to one another in a transfer plane 31, 32a, 32b, 33. Thereby the sections 21a, 21b, 21c of the respective transfer plane 31, 32a, 32b, 33 vary in number and internal cross-sections. Here, in particular, gas flow S can flow through the transfer planes 31, 32a, 32b, 33 one after the other. As a result, when cross-current or cross-counter flow around the flow channels 20 takes place, an adjustment in the total internal cross-sectional area (total of all internal cross-sectional areas of the flow channels) is made over their course. As a result, Reynolds numbers, for example, in the evaporating, i.e. phase-changing, water W can be kept constant over the course of the flow channels 20.

FIG. 6B shows a front view of the flow channel arrangement 22 from FIG. 6A. The dimensions of sections 21a, 21b, 21c indicate that an adjustment of the overall internal cross-sectional area is possible, depending on material variables that change during the phase change, in particular, density, volume and flow velocity of water. Here, the total internal cross-sectional area can be adjusted, for example, via an internal cross-section of a single section 21a, 21b, 21c, a number of sections 21a, 21b, 21c or a combination of both of these options.

By way of example, the sections 21a and 21b of the transfer planes 31 and 32 have different cross-sections 41 and 42 and the number of first sections 21a differs from the number of second sections 21b. The sections 21b and 21c of the transfer planes 32a, b and 33 have the same cross-sections 42 and 43 and the number of second sections 21b differs from the number of third sections 21c. Such an optimized design of the cross sections 41, 42, 43 and numbers of different sections 21 or different transfer planes 31, 32, 33 can improve the performance of the heat exchanger 8.

Figure 7A:
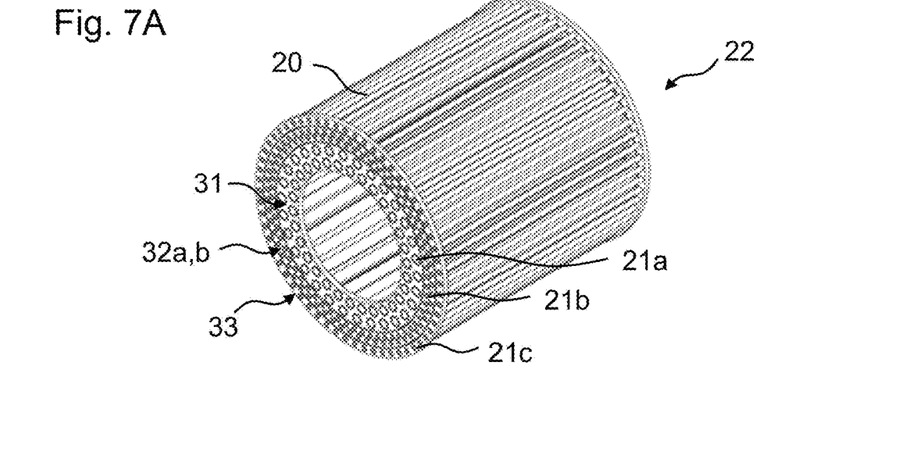
FIGS. 7A, 7B, 7C are schematic views of a first embodiment of flow channels of a heat exchanger of an exemplary turbomachine as per the present disclosure.
Figure 7B:
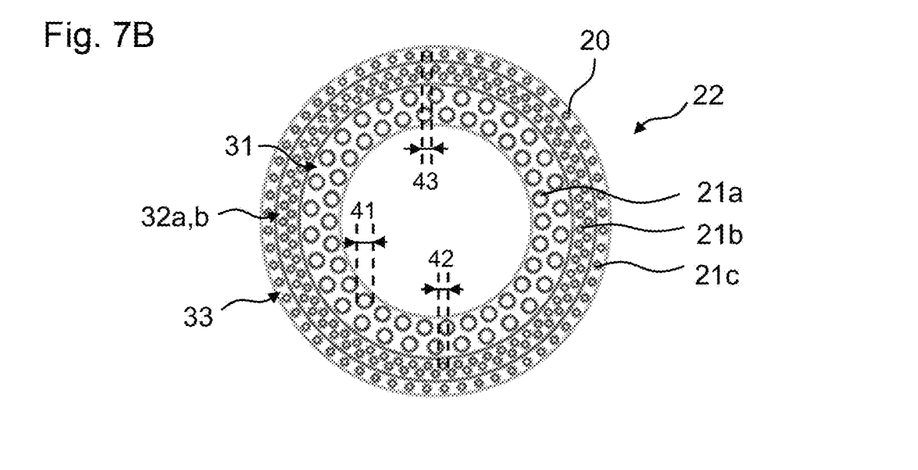
Figure 7C:
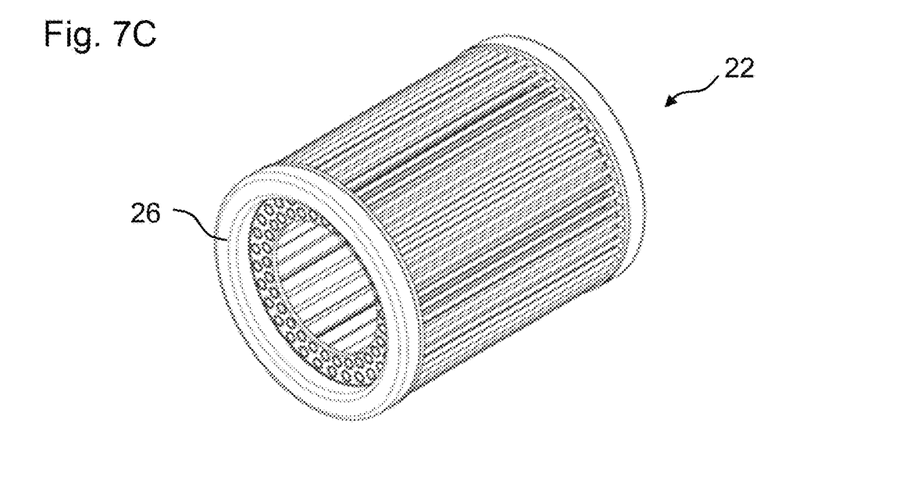

FIGS. 7A, 7B, and 7C each show views of flow channels 20 in an axis-symmetric arrangement 22.

FIG. 7A shows a perspective view of a second exemplary embodiment of a flow channel arrangement 22. The flow channels 20 have three sections 21a, 21b, 21c arranged parallel to one another, each of which is arranged in concentric transfer planes 31, 32a, b, 33. Here, the sections 21a, 21b, 21c of the respective planes 31, 32a, b, 33 have different numbers and internal cross-sections.

FIG. 7B shows a front view of the flow channel arrangement 22 from FIG. 7A. By way of example, the sections 21a and 21b of the arrangement planes 31 and 32a, 32b have different cross-sections 41 and 42 and the number of first sections 21a differs from the number of second sections 21b. The sections 21b and 21c of the arrangement planes 32 and 33 have the same cross-sections 42 and 43 and the number of second sections 21b differs from the number of third sections 21c. By such a design of the cross-sections 41, 42, 43 and the number of different sections 21, heat transfer in a heat exchanger 8 can be improved for an axis-symmetric flow around the flow channels 20, in particular in a cross-counterflow configuration.

FIG. 7C shows the perspective view of the second exemplary embodiment of a flow channel arrangement 22 from FIG. 7A, wherein the sections 21c and the sections 21b of the flow channels 20 are connected by means of a connecting element 26. The connecting element 26 is equipped to divert the water W from the sections 21b of the flow channels 20 to the subsequent sections 21c of the flow channels 20. In the present exemplary embodiment, the connecting element 26 is equipped to redirect water W from the sections 21b of the flow channels 20 into the subsequent sections 21c of the flow channels 20. In the present exemplary embodiment, the connecting element 26 is equipped to collect water W from the sections 21b of the arrangement plane 32 in a plenum and to direct it to the sections 21c of the arrangement plane 32. This allows the water W to be diverted despite the differing number of sections 21b and 21c.

Figure 8A:
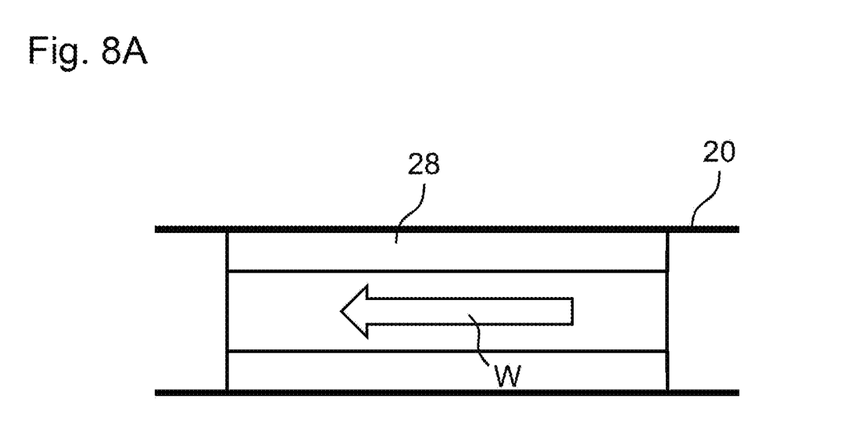
FIGS. 8A, 8B are each a schematic sectional view of a first and a second exemplary embodiment of a flow channel with a flow element of a heat exchanger of a turbomachine example as per the present disclosure.
Figure 8B:
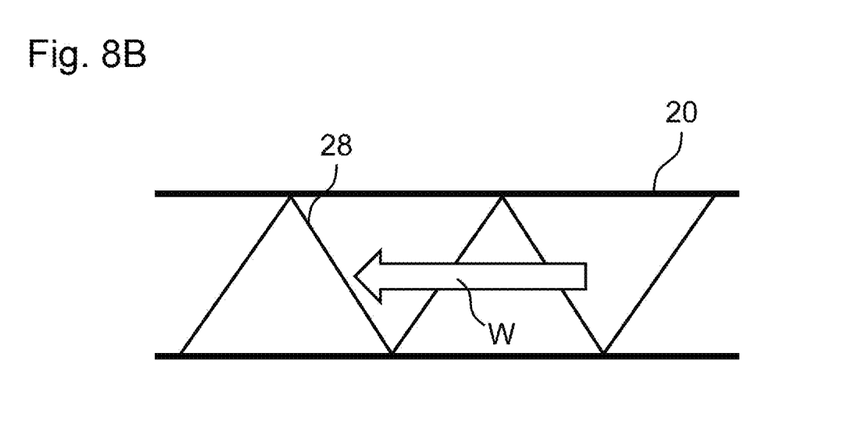

FIGS. 8A and 8B each show sectional views of flow channels 20, which have a flow element 28.

In the representation of FIG. 8A, a first exemplary embodiment of a flow element 28 in the form of an insert is shown, which is arranged in the cross-section of the flow channel 20 through which water W flows. This flow element 28 is equipped to reduce the cross-section of the flow channels 20 at least in sections, in order to improve the heat transfer from the channel walls to the water using modified surface structures or flow guidance.

FIG. 8B represents a second exemplary embodiment of a flow element 28, designed in the form of a grid structure and is arranged in the cross-section of the flow channel 20 through which flow can take place, in particular, in an evaporation region of the flow channel 20. Such a grid structure 28 can create turbulence and, in particular, the droplets present in a water (steam) flow can be brought to a wall of the flow channel or to a part of the flow element 28 that is connected in a heat-conducting manner to the wall, in order to improve the heat supply.

What is claimed is:

1. A turbomachine for an aircraft propulsion drive with a gas flow in a flow direction of the turbomachine through a compressor, comprising:
    a combustion chamber,
    a turbine and
    a heat exchanger downstream of the turbine,
    wherein the heat exchanger is configured and arranged to use energy from the gas flow in the flow direction of the turbomachine from burned fuel in the combustion chamber,
    wherein the heat exchanger has at least two flow channels substantially extending in at least one transfer plane and being parallel to the flow direction of the turbomachine, through which material substantially flows also parallel to the flow direction of the turbomachine, the gas being configured and arranged to flow perpendicularly across the at least two flow channels, in the at least one transfer plane, which are located parallel to the flow direction of the turbomachine, the at least two flow channels of the heat exchanger at least partially radially overlapping the turbine,
    whereby each flow channel is configured and arranged with the at least one transfer plane in the flow direction of the turbomachine equidistant to the turbine.

2. The turbomachine according to claim 1, wherein the flow channels are arranged parallel to each other in a transfer plane.

3. The turbomachine according to claim 1, wherein the at least one flow channel has at least two sections arranged parallel to each other, which run in different transfer planes arranged parallel to each other.

4. The turbomachine according to claim 1, wherein the gas flows around the at least one flow channel at least in sections at an angle.

5. The turbomachine according to claim 3, wherein at least two sections of the flow channels are connected by a connecting element.

6. The turbomachine according to claim 5, wherein the connecting element is equipped to deflect material from one section of a flow channel to at least one subsequent section of at least one flow channel.

\* \* \* \* \*